US012670117B2

(12) United States Patent
Raval et al.

(10) Patent No.: US 12,670,117 B2
(45) Date of Patent: Jun. 30, 2026

(54) ALLOCATING PERIPHERAL COMPONENT INTERFACE EXPRESS (PCIE) STREAMS IN A CONFIGURABLE MULTIPORT PCIE CONTROLLER

(71) Applicant: ATI TECHNOLOGIES ULC, Markham (CA)

(72) Inventors: Nippon Raval, Markham (CA); Philip Ng, Markham (CA); Jaroslaw Marczewski, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 215 days.

(21) Appl. No.: 17/565,912

(22) Filed: Dec. 30, 2021

(65) Prior Publication Data
US 2023/0214346 A1 Jul. 6, 2023

(51) Int. Cl.
*G06F 13/00* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC .................... G06F 13/4221; G06F 2213/0026
See application file for complete search history.

(56) References Cited

U.S. PATENT DOCUMENTS

| | | | | |
|---|---|---|---|---|
| 9,110,731 B1 * | 8/2015 | Sicola | .................... | G06F 9/5088 |
| 9,720,439 B2 * | 8/2017 | Tennant | .................... | G06F 1/12 |
| 10,310,995 B1 * | 6/2019 | Malygin | ............. | G06F 13/1605 |
| 2014/0059265 A1 | 2/2014 | Iyer et al. | | |
| 2014/0181355 A1 * | 6/2014 | Barbiero | ............. | G06F 13/4022 |
| | | | | 710/316 |
| 2014/0281070 A1 | 9/2014 | Natu et al. | | |
| 2015/0324312 A1 * | 11/2015 | Jacobson | ............. | G06F 13/362 |
| | | | | 710/104 |
| 2017/0221175 A1 * | 8/2017 | Liang | .................. | G06F 13/4282 |
| 2019/0251055 A1 | 8/2019 | Chen et al. | | |
| 2019/0281025 A1 * | 9/2019 | Harriman | ............. | H04L 9/3239 |
| 2020/0042482 A1 | 2/2020 | Harriman et al. | | |
| 2020/0183876 A1 | 6/2020 | Sharma et al. | | |
| 2021/0117307 A1 * | 4/2021 | MacNamara | ....... | G06F 11/3433 |
| 2021/0240655 A1 | 8/2021 | Sharma | | |

(Continued)

FOREIGN PATENT DOCUMENTS

CN          103853676 B          8/2016

OTHER PUBLICATIONS

Intel Corporation, PHY Interface For the PCI Express, SATA, USB 3.1, DisplayPort, and Converged IO Architectures, Version 5.1, URL: https://www.intel.com/content/www/us/en/io/pci-express/phy-interface-pci-express-sata-usb30-architectures-3-1.html, sections 2, 8, 9, and 10; pp. 13, 14, 114, 115, 158-160; figure 2-1, dated Feb. 7, 2018, 161 pages.

(Continued)

*Primary Examiner* — Henry Tsai
*Assistant Examiner* — Kim T Huynh

(57) ABSTRACT

Allocating peripheral component interface express (PCIe) streams in a configurable multiport PCIe controller, including: detecting, by a PCIe controller, a link by a first PCIe device; and allocating, for the link between the PCIe controller and the first PCIe device, a first one or more PCIe streams from a pool of PCIe streams.

20 Claims, 7 Drawing Sheets

100—

(56)　　　　　References Cited

U.S. PATENT DOCUMENTS

2021/0281618 A1　　9/2021　Mosur et al.
2023/0266988 A1*　8/2023　Fong .................... G06F 9/5077
　　　　　　　　　　　　　　　　　　718/105

OTHER PUBLICATIONS

International Search Report and Written Opinion, PCT/IB2022/
062739, Mar. 21, 2023, 10 pages.

* cited by examiner

100

ALLOCATING PERIPHERAL COMPONENT INTERFACE EXPRESS (PCIE) STREAMS IN A CONFIGURABLE MULTIPORT PCIE CONTROLLER

BACKGROUND

Peripheral component interface express (PCIe) devices with the Integrity and Data Encryption (IDE) feature use IDE streams for encrypted communications with a controller. An IDE stream is a logical encrypted connection between two PCIe ports. PCIe controllers are typically limited in the number of streams that can be supported across all connected devices. For example, PCIe controllers implement a predefined pool of streams that are allocated to connected devices.

DETAILED DESCRIPTION

Figure 1A:
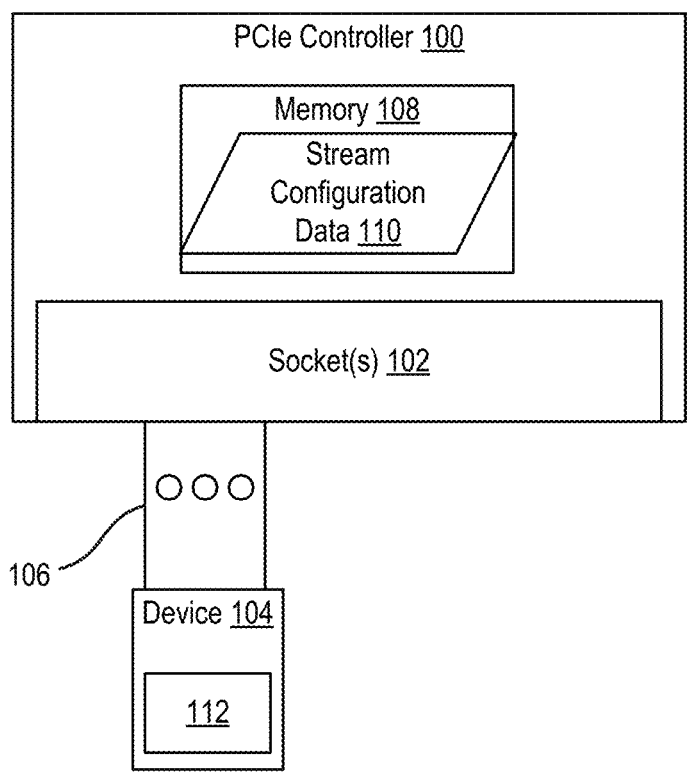
FIG. 1A is a block diagram of an example peripheral component interface express (PCIe) controller for allocating peripheral component interface express (PCIe) streams in a configurable multiport PCIe controller according to some implementations.

Peripheral component interface express (PCIe) devices with the Integrity and Data Encryption (IDE) feature use IDE streams for encrypted communications with a controller. An IDE stream is a logical encrypted connection between two PCIe ports, such as the controller and a peripheral device. PCIe controllers are typically limited in the number of streams that can be supported across all connected devices. For example, PCIe controllers implement a predefined pool of streams that are allocated to connected devices.

To that end, the present specification sets forth various implementations for allocating peripheral component interface express (PCIe) streams in a configurable multiport PCIe controller. In some implementations, a method of allocating peripheral component interface express (PCIe) streams in a configurable multiport PCIe controller includes: detecting, by a PCIe controller, a link by a first PCIe device. The method also includes allocating, for the link between the PCIe controller and the first PCIe device, a first one or more PCIe streams from a pool of PCIe streams.

In some implementations, allocating the one or more PCIe streams includes receiving, from the first PCIe device, data indicating a number of requested streams for the first PCIe device and a number of PCIe lanes used by the first PCIe device, wherein the one or more PCIe streams are allocated based on the number of requested streams and the number of PCI lanes. In some implementations, the one or more PCIe streams are allocated proportional to a number of lanes used by the first PCIe device. In some implementations, the method further includes detecting, by the PCIe controller, another link by a second PCIe device, and allocating, to the second PCIe device, a second one or more PCIe streams from the pool of PCIe streams. In some implementations, allocating the second one or more PCIe streams includes reallocating at least one of the first one or more PCIe streams from the first PCIe device to the second PCIe device. In some implementations, the method further includes detecting a removal of the first PCIe device, and releasing the first one or more PCIe streams. In some implementations, the method further includes reallocating one or more of the first one or more PCIe streams to one or more other PCIe devices.

The present specification also describes various implementations of a multiport PCI controller that performs steps including detecting a link by a first PCIe device. The steps also include allocating, for the link between the PCIe controller and the first PCIe device, a first one or more PCIe streams from a pool of PCIe streams.

In some implementations, allocating the one or more PCIe streams includes receiving, from the first PCIe device, data indicating a number of requested streams for the first PCIe device and a number of PCIe lanes used by the first PCIe device, and wherein the one or more PCIe streams are allocated based on the number of requested streams and the number of PCI lanes. In some implementations, the one or more PCIe streams are allocated proportional to a number of lanes used by the first PCIe device. In some implementations, the steps further include detecting, by the PCIe controller, another link by a second PCIe device, and allocating, to the second PCIe device, a second one or more PCIe streams from the pool of PCIe streams. In some implementations, allocating the second one or more PCIe streams includes reallocating at least one of the first one or more PCIe streams from the first PCIe device to the second PCIe device. In some implementations, the steps further include detecting a removal of the first PCIe device, and releasing the first one or more PCIe streams. In some implementations, the steps further include reallocating one or more of the first one or more PCIe streams to one or more other PCIe devices.

Also described in this specification are various implementations of an apparatus for allocating peripheral component interface express (PCIe) streams in a configurable multiport PCIe controller. Such an apparatus includes a processor, a PCIe controller operatively coupled to the processor, the PCIe controller configured to perform steps including detecting a link by a first PCIe device. The steps also include allocating, for the link between the PCIe controller and the first PCIe device, a first one or more PCIe streams from a pool of PCIe streams.

In some implementations, allocating the one or more PCIe streams includes receiving, from the first PCIe device, data indicating a number of requested streams for the first PCIe device and a number of PCIe lanes used by the first PCIe device, and wherein the one or more PCIe streams are allocated based on the number of requested streams and the number of PCI lanes. In some implementations, the one or more PCIe streams are allocated proportional to a number of lanes used by the first PCIe device. In some implementations, the steps further include detecting, by the PCIe controller, another link by a second PCIe device, and allocating, to the second PCIe device, a second one or more PCIe streams from the pool of PCIe streams. In some implementations, allocating the second one or more PCIe streams includes reallocating at least one of the first one or more PCIe streams from the first PCIe device to the second PCIe device. In some implementations, the steps further include detecting a removal of the first PCIe device, and releasing the first one or more PCIe streams.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

FIG. 1A is a block diagram of a non-limiting example peripheral component interface express (PCIe) controller 100. The example PCIe controller 100 can be implemented in a variety of computing devices, including mobile devices, personal computers, peripheral hardware components, gaming devices, set-top boxes, and the like. In addition to the description set forth with respect to FIGS. 1A-1C, the functionality of the PCIe express controller 100 is described in further detail in the methods described in FIGS. 3-5. The PCIe controller 100 allows for the coupling and integration of PCIe-compatible devices and components into a device or system. As an example, the PCIe controller 100 allows for peripheral components that use PCIe to be added to a computer or other device.

The PCIe controller 100 contains all of the hardware logic needed to implement the transaction layer and data link layer of the PCIe specification for a single PCIe port. A PCIe port is used to send and receive data on one end of a PCIe link. In this example, the PCIe controller 100 is a multiport PCIe controller 100. A multiport PCIe controller 100 is a controller implementation that supports multiple PCIe ports. In some implementations, a multiport controller is more efficient than multiple single-port controllers by sharing some logic between ports. Additionally, in some implementations, it is more efficient to support various link subdivision modes where a fixed number of PHY lanes (described in further detail below) are mapped to different possible port configurations (ex. 16 lanes being used as either a single ×16 port or 2×8 ports). In some implementations, a multiport controller is able to partition a shared receive buffer to handle the bandwidth of a single 16 lane port or 2 8 lane ports whereas this is not possible with 2 single-port controllers.

The PCIe controller 100 includes one or more sockets 102. The one or more sockets 102 are physical interfaces for coupling or linking one or more PCIe devices to the PCIe controller 100. As shown in FIG. 1A, a single device 104 (e.g., a PCIe-compatible device) is coupled to the PCIe controller 100 via the sockets 102. The device 104 includes any PCIe-compatible device, such as a peripheral component of a computer, a parallel accelerator such as a graphics processing unit (GPU), or other device as can be appreciated.

The device 104 is coupled to the socket 102 using one or more lanes 106. A lane 106 is a physical conductive connection between two endpoints, in this case the socket 102 and device 104. As used in PCIe, a lane 106 includes two pairs of conductive wires or traces, one used for sending data and one used for receiving data. A PCIe-compatible device 104 is described or characterized using the number of lanes 106 used to connect the device 104. For example a ×4 device 104 (e.g., a "by-four" device 104) uses four lanes 106 to connect to a PCIe controller 100. Accordingly, such a device 104 requires at least four available lanes 106 in a socket 102 to connect.

In some implementations, the socket 102 will have some number of available lanes 106 (e.g., lane 106 connection points). Accordingly, the socket 102 is able to support connections by some number of devices 104 whose combined number used of lanes 106 is less than or equal to the number of lanes 106 provided by the sockets 102. As an example, a sixteen-lane 106 socket 102 is able to support a single device 104 of up to sixteen lanes 106, or multiple devices totaling sixteen lanes 106 (e.g., a by-eight device 104 and two by-four devices 104).

In order to perform encrypted communications between a PCIe controller 100 and a device 104, the PCIe controller 100 establishes one or more "streams" between the PCIe controller 100 and device 104. As described herein, a "stream" is a logically defined encrypted communications pathway or session between a PCIe controller 100 and a device 104. In some implementations, the "streams" include PCIe Integrity and Data Encryption (IDE) streams that use the IDE features of PCIe to maintain the logically encrypted pathway. To establish a stream, the PCIe controller 100 maintains in memory 108 stream configuration data 110. Each portion of stream configuration data 110 includes the requisite data to be provided to a device 104 in order to establish a single stream with that device 104. As an example, the stream configuration data 110 includes one or more keys (e.g., encryption keys, decryption keys, and the like) used to encrypt or decrypt communications between the device 104 and the PCIe controller 100. For example, a portion of stream configuration data 110 includes a string defining a plurality of keys with each key corresponding to a substring of the string. As another example, the stream configuration data 110 includes an initialization vector to begin an encrypted communications session between the device 104 and the PCIe controller 100.

The PCIe controller 100 maintains a fixed amount of stream configuration data 110. In other words, as each portion of stream configuration data 110 corresponds to particular stream, the PCIe controller 100 maintains a collection or "pool" of streams that are allocated to devices 104 interfacing with the PCIe controller 100. Where a device 104 is capable of supporting streams to the PCI controller 100 (e.g., where a device 104 is capable of performing encrypted communications to the PCIe controller 100), the PCIe controller 100 allocates one or more streams to the device 104. One skilled in the art will appreciate that, in some implementations, a device 104 is capable of maintaining multiple streams to the PCIe controller 100 concurrently. To allocate a stream to a device 104, the PCIe controller 100 provides, for each stream allocated to the device 104, a portion of stream configuration data 110 corresponding to the allocated stream. The device 104 then performs the necessary configuration operations to use the stream configuration data 110 for each allocated stream.

In some implementations, allocating the streams to a device 104 includes receiving, from the device 104, data indicating a number of streams requested by the device 104. For example, in some implementations, a device 104 stores in a configuration space 112 data indicating various operational parameters of the device 104. Such parameters include, for example, unique identifiers for the device 104, identified protocols or versions (e.g., PCIe versions) supported by the device 104, a number of lanes 106 used by the device 104, a maximum number of streams supported by the device 104, a number of streams requested by the device 104 on connection, and other parameters as can be appreciated.

Accordingly, in response to a connection of the device 104 to the socket 102, the device 104 provides the data indicating a number of streams requested by the device 104. In some implementations, the number of streams requested by the device 104 is equal to a maximum number of streams supported by the device 104. The PCIe controller 100 then allocates, from the pool of available streams, some number of streams less than or equal to the indicated number of requested streams and provides, to the device, the corresponding portions of stream configuration data 110. As the number of available streams on the PCIe controller 100 is fixed and finite, the PCIe controller 100 is prevented from having an excessive number of streams unnecessarily allocated to a device 104 that is incapable of using them.

In some implementations, the number of streams allocated to a device 104 is proportional or based on the number of lanes 106 used by the device 104. In some implementations, the number of streams allocated to a device 104 is proportional to a number of lanes 106 used by the device 104 relative to the number of lanes 106 provided by the PCIe controller 100. As an example, assume that the PCIe controller 100 has available via sockets 102 sixteen lanes 106. Assume that the PCIe controller 100 has sixty-four streams in its pool of streams, meaning that the PCIe controller 100 can support up to sixty-four concurrent streams. Further assume that no streams are currently allocated, meaning all sixty-four streams are available for allocation. Where a by-sixteen device 104 (e.g., a sixteen lane 106 device 104) is liked with the PCIe controller 100, in some implementations, the device 104 is allocated all sixty-four streams as the device 104 uses all possible lanes 106. As another example, where a by-eight device 104 is attached, thirty-two streams are allocated (e.g., half the pool of streams) as the device 104 uses half the supported lanes 106.

One skilled in the art will appreciate that, where a device 104 supports some maximum number of streams known to the PCIe controller 100, in some implementations, the number of allocated streams is limited by the maximum number of supported streams. Continuing with the example above, assume that a by-sixteen device 104 with a maximum number of thirty-two supported streams is coupled to the PCIe controller 100. Instead of allocating all sixty-four streams to the device 104 as is proportional to the number of used lanes 106, the maximum supported thirty-two streams are instead allocated to the device 104. As a further example, where a by-eight device 104 with a maximum number of sixteen streams is coupled to the PCI controller 100, the maximum sixteen streams are allocated instead of the proportional thirty-two streams.

In some implementations, the number of streams allocated to a device 104 is proportional or based on the number of lanes 106 used by the device 104 relative to other devices 104 coupled to other devices coupled to the PCI controller 100. For example, assume that a by-eight device 104 is coupled to a PCIe controller 100 supporting sixteen lanes 106 and having a pool of sixty-four streams. The by-eight device 104 is allocated all sixty-four streams as, of the eight lanes 106 of the PCIe controller 100 being used, all are being used by the device 104. Where the by-eight device 104 is coupled to the PCIe controller 100 along with two by-four devices 104, the by-eight device 104 (using half the lanes 106) is allocated thirty-two streams (half the streams), while the by-four devices 104 (each using one quarter of the lanes 106) are each allocated sixteen streams (one quarter of the streams each).

In some implementations, where the pool of streams is stored in an ordered or structured fashion, the streams allocated to the device 104 are allocated at least partially as a contiguous portion of the pool of streams. For example, in some implementations, streams are preferentially allocated as a contiguous portion of the pool of streams.

The PCIe controller 100 is capable of dynamically allocating and reallocating streams as additional devices are coupled or removed from the PCIe controller 100. Moving on to the example of FIG. 1B, assume that, after coupling the device 104 and allocating some portion of the pool of streams to the device 104, devices 114 and 124, each with respective configuration spaces 122 and 132, are coupled to the PCIe controller 100. In this example, assume that the PCIe controller 100 supports sixteen lanes 106 and has a pool of sixty four streams, that the device 104 uses eight lanes 106 (e.g., a by-eight device 104) and that the devices 114,124 each use four lanes 106.

In response to detecting the connection of the devices 114,124, the PCIe controller 100 allocates some portion of the pool of streams to each device 114, 124. For example, assume that the device 104 was allocated thirty-two of the sixty-four streams as a proportional allocation to the number of lanes 106 used by the device 104 (e.g., half). In some implementations, the device 114 and device 124 are each allocated sixteen of the remaining thirty-two streams, proportional to their each using four lanes 106 each.

As another example, assume that the device 104 was allocated all sixty-four available streams (e.g., by virtue of being the only device coupled to the PCIe controller 100 at the time of allocation). In such an example, some portion of the streams allocated to the device 104 must be reallocated to the devices 114,124. In other words, some portion of the streams allocated to the device 104 are released so that they are available for reallocation to the devices 114,124.

In some implementations, reallocation of streams allocated to the device 104 includes logically severing a connection to the device 104. For example, all existing communications sessions between the device 104 and the PCIe controller 100 are ended. In some implementations, the device 104 is reset or restarted in order to reinitialize a stream allocation process. In other implementations, the device 104 is provided a command or signal to end usage of one or more streams, or potentially all streams, until a new allocation of streams are provided. Then, the PCIe controller 100 allocates streams to the devices 114,124. For example, in some implementations, the PCIe controller 100 provides stream configuration data 110 corresponding to the allocated streams to the devices 114,124. In implementations, where the connection to the device 104 is restarted, requiring a new allocation of streams to the device 104, the PCIe controller 100 also provides stream configuration data 110 corresponding to the new allocation of streams. In other words, in some implementations, a portion of the streams allocated to the device 104 remain allocated while another portion of the steams is reallocated to the devices 114,124, while in other implementations all streams allocated to the device 104 are effectively released (e.g., due to a restarted link or a device 104 restart) and a new allocation of streams to the devices 104,114,124 is performed.

As devices are removed from the PCIe controller 100, their respective allocated streams are released. Such released streams are then reallocated to other devices, or remain unallocated for use should another device be connected. Continuing with the example of FIG. 1B and moving to FIG. 1C, assume that the device 124 was disconnected from the PCIe controller 100. Further assume that, prior to removal of the device 124, the device 104 had thirty-two streams allocated and the devices 114,124 each had sixteen streams allocated. In some implementations, after removal of the device 124, the sixteen streams allocated to the device 124 are effectively restored to the pool of available streams such that any of these streams are available for allocation to another device in the future. In some implementations, one or more of these streams previously allocated to the device 124 are reallocated to the device 104 or the device 124.

One skilled in the art will appreciate that the approaches described herein allow for the dynamic allocation of streams to PCIe devices to a PCIe controller. Such dynamic allocation allows for devices to be added and removed during operation and streams to be allocated accordingly. Accordingly, as devices are added, streams are allocated from the pool of available streams, reallocated from those streams allocated to already coupled devices, or combinations thereof. As devices are removed, their allocated streams are released. The released streams are added back to the pool of streams for later use, reallocated to devices still connected, or both.

In some implementations, the PCIe controller 100 of FIG. 1 is implemented in a computer 200. The computer 200 includes least one processor 202. In addition to at least one processor 202, the computer 200 of FIG. 2 includes random access memory (RAM) 204 which is connected through a high speed memory bus 206 and bus adapter 208 to processor 202 and to other components of the computer 200. Stored in RAM 204 is an operating system 210. The operating system 210 in the example of FIG. 2 is shown in RAM 204, but many components of such software typically are stored in non-volatile memory also, such as, for example, on data storage 212, such as a disk drive.

Figure 2:
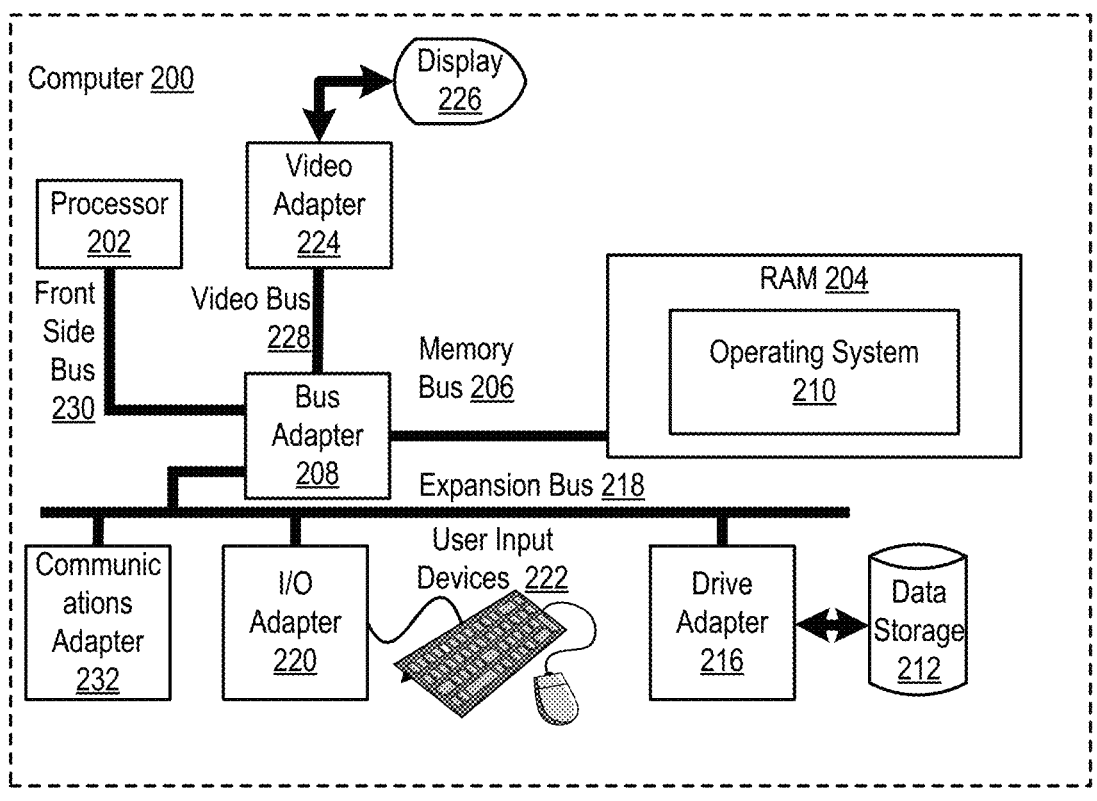
FIG. 2 is an example computer for allocating peripheral component interface express (PCIe) streams in a configurable multiport PCIe controller according to some implementations.

The computer 200 of FIG. 2 includes disk drive adapter 216 coupled through expansion bus 218 and bus adapter 208 to processor 202 and other components of the computer 200. Disk drive adapter 216 connects non-volatile data storage to the computer 200 in the form of data storage 212. Such disk drive adapters include Integrated Drive Electronics ('IDE') adapters, Small Computer System Interface ('SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 200 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 200 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary computer 200 of FIG. 2 includes a communications adapter 232 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 232 implement the hardware level of data communications through which one computer sends data communications to another computer, directly or through a data communications network. Such communication adapters 232 include modems for wired dial-up communications, Ethernet (IEEE 802.3) adapters for wired data communications, and 802.11 adapters for wireless data communications.

Figure 1B:
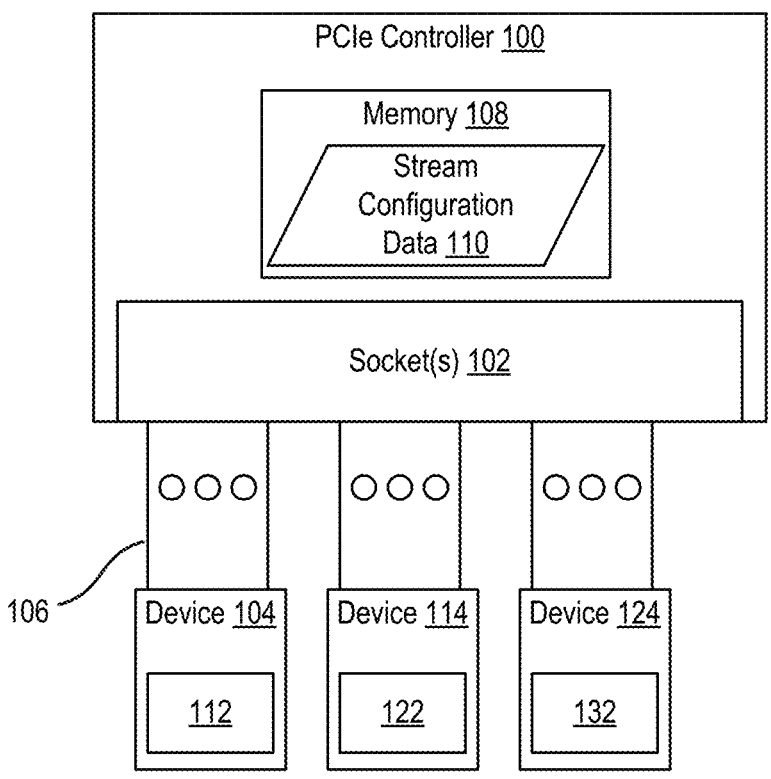
FIG. 1B is a block diagram of an example peripheral component interface express (PCIe) controller for allocating peripheral component interface express (PCIe) streams in a configurable multiport PCIe controller according to some implementations.
Figure 1C:
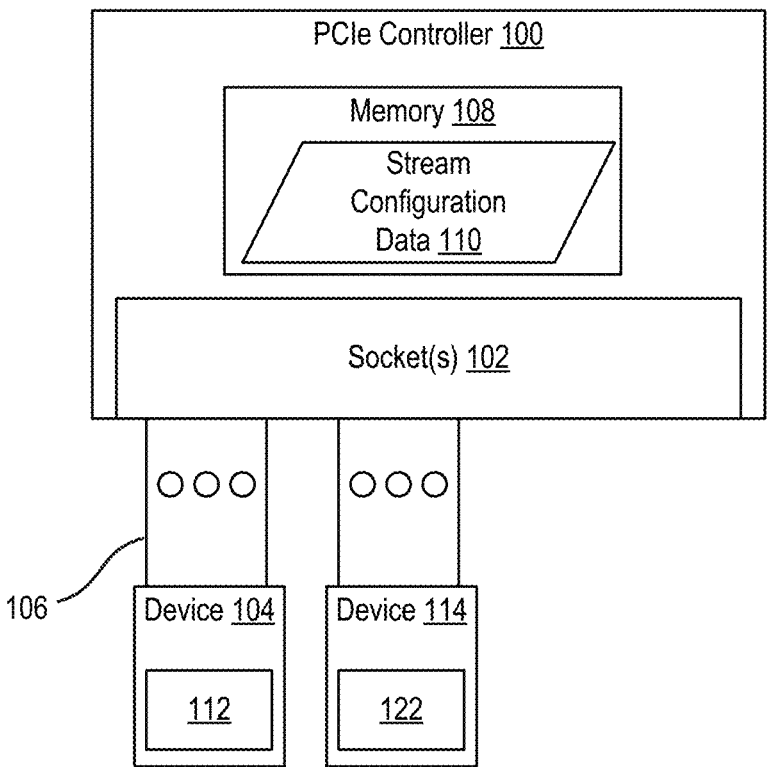
FIG. 1C is a block diagram of an example peripheral component interface express (PCIe) controller for allocating peripheral component interface express (PCIe) streams in a configurable multiport PCIe controller according to some implementations.
Figure 3:
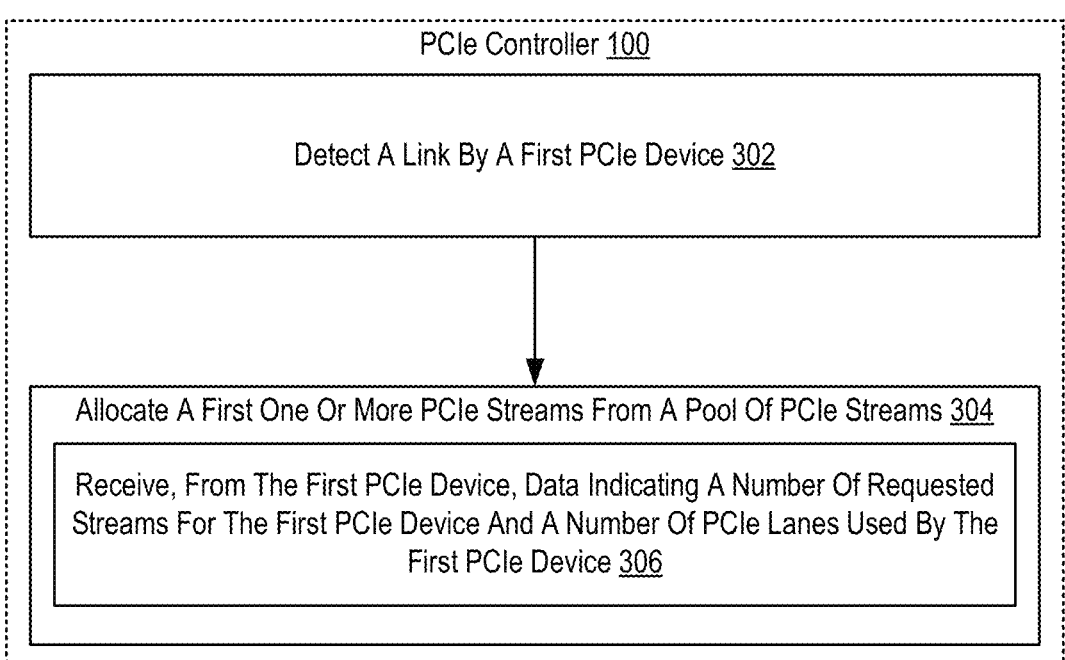
FIG. 3 is a flowchart of an example method for allocating peripheral component interface express (PCIe) streams in a configurable multiport PCIe controller according to some implementations.
Figure 4:
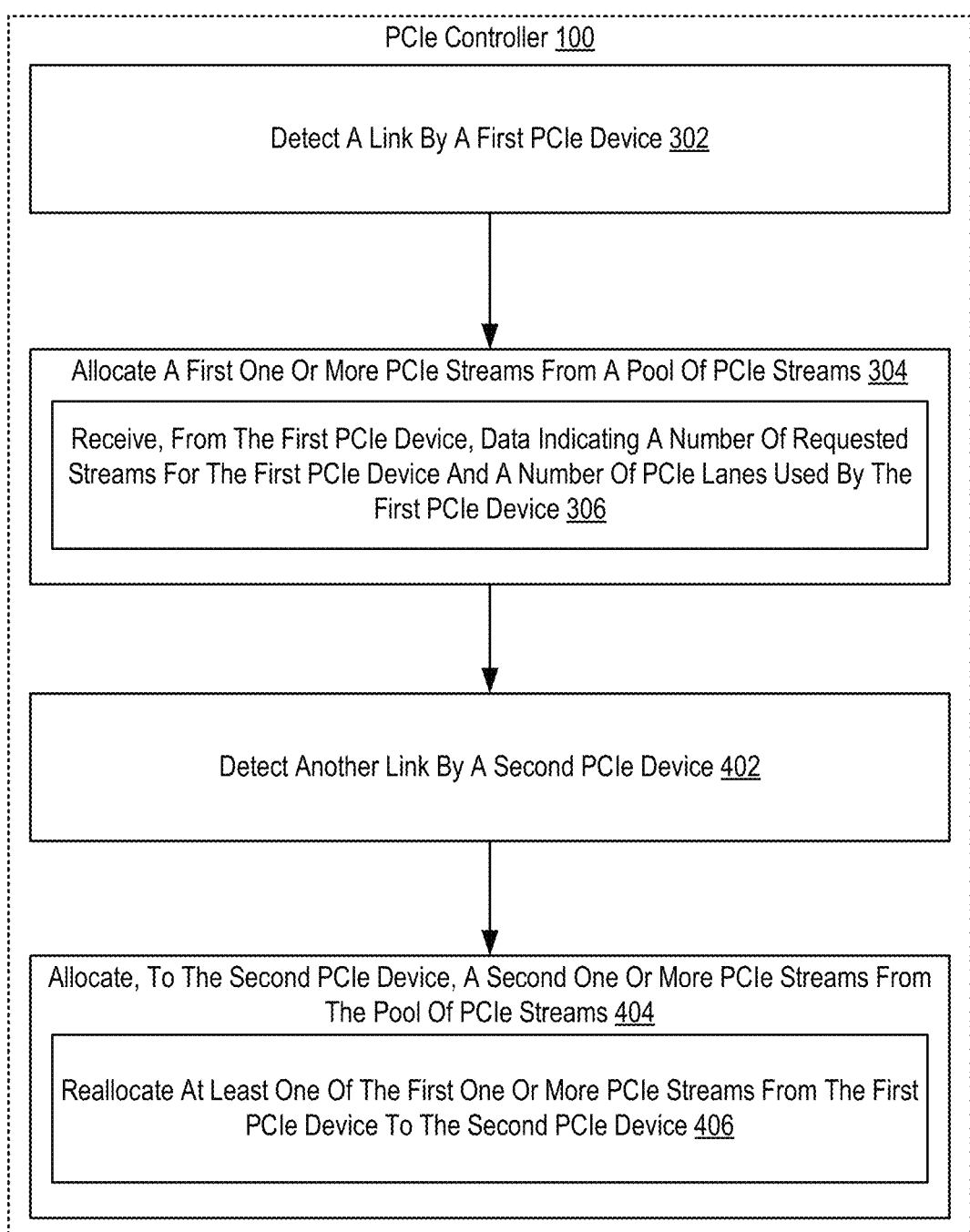
FIG. 4 is a flowchart of another example method for allocating peripheral component interface express (PCIe) streams in a configurable multiport PCIe controller according to some implementations.
Figure 5:
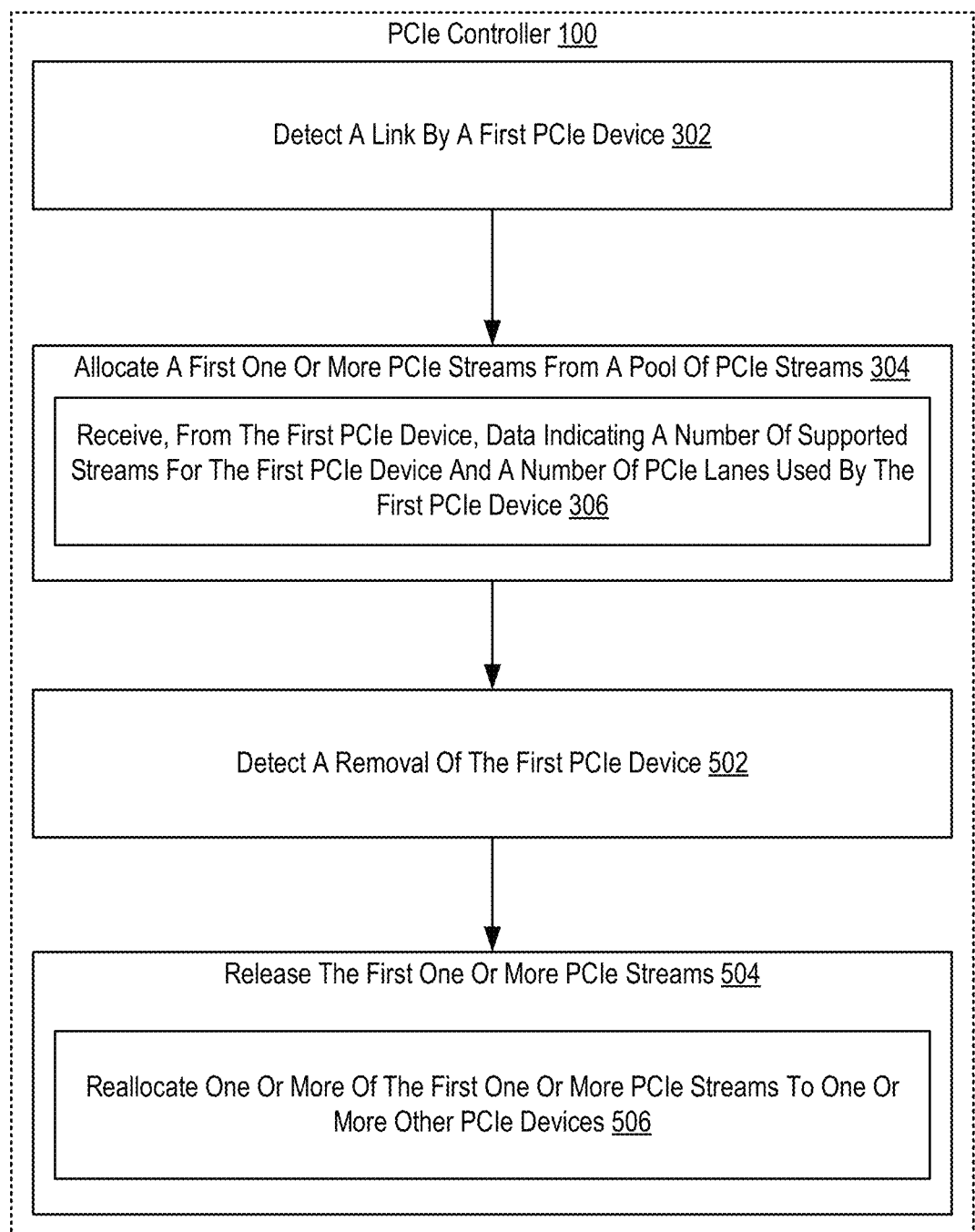
FIG. 5 is a flowchart of another example method for allocating peripheral component interface express (PCIe) streams in a configurable multiport PCIe controller according to some implementations.

The approaches described for allocating peripheral component interface express (PCIe) streams in a configurable multiport PCIe controller with respect to FIGS. 1A-1C are also described as methods in the flowcharts of FIGS. 3-5. Accordingly, for further explanation, FIG. 3 sets forth a flow chart illustrating an example method for allocating peripheral component interface express (PCIe) streams in a configurable multiport PCIe controller. The method of FIG. 3 is implemented, for example, in a PCIe controller 100. The method of FIG. 3 includes detecting 302 a link by a first PCIe device 104. In some implementations, detecting 302 the link includes receiving an indication of the link from a backplane component to which the PCIe controller 100 is operatively coupled. In some implementations, the PCIe controller 100 receives an indication of the link from a Basic Input/Output System (BIOS). As an example, the PCIe controller 100 receives the indication from BIOS during a system startup where the device 104 is coupled to the PCIe controller 100 at startup. In other implementations, the PCIe controller 100 detects the link by the first PCIe device 104 in response to the first PCIe device 104 being coupled to the PCIe controller 100 (e.g., via a socket 102) while a device including the PCIe controller 100 is active.

The method of FIG. 3 also includes allocating 304 a first one or more PCIe streams from a pool of PCIe streams (e.g., to the first PCIe device 104). As was set forth above, a "stream" is a logically defined encrypted communications pathway or session between a PCIe controller 100 and a device 104. The PCIe controller 100 maintains in memory 108 (e.g., read-only memory (ROM) or some other type of memory) stream configuration data 110 embodying a "pool" of streams usable by the PCIe controller 100. Each portion of stream configuration data 110 includes the requisite data to be provided to a device 104 in order to establish a single stream with that device 104. As an example, the stream configuration data 110 includes one or more keys (e.g., encryption keys, decryption keys, and the like) used to encrypt or decrypt communications between the device 104 and the PCIe controller 100. For example, a portion of stream configuration data 110 includes a string defining a plurality of keys with each key corresponding to a substring of the string. As another example, the stream configuration data 110 includes an initialization vector to begin an encrypted communications session between the device 104 and the PCIe controller 100.

The PCIe controller 100 maintains a fixed amount stream configuration data 110. In other words, as each portion of stream configuration data 110 corresponds to particular stream, the PCIe controller 100 maintains a collection or "pool" of streams available for allocation to devices 104 interfacing with the PCIe controller 100. Where a device 104 is capable of supporting streams to the PCI controller 100 (e.g., where a device 104 is capable of performing encrypted communications to the PCIe controller 100), the PCIe controller 100 allocates one or more streams to the device 104. A stream allocated to a particular device 104 is then effectively "removed" from the pool of streams in that it is unable to be allocated to another device 104 while allocated to the particular device 104. One skilled in the art will appreciate that, in some implementations, a device 104 is capable of maintaining multiple streams to the PCIe controller 100 concurrently. To allocate a stream to a device 104, the PCIe controller 100 provides, for each stream allocated to the device 104, a portion of stream configuration data 110 corresponding to the allocated stream. The device 104 then performs the necessary configuration operations to use the stream configuration data 110 for each allocated stream.

In some implementations, the number of streams allocated to a device 104 is proportional or based on the number of lanes 106 used by the device 104. In some implementations, the number of streams allocated to a device 104 is proportional to a number of lanes 106 used by the device 104 relative to the number of lanes 106 provided by the PCIe controller 100. As an example, assume that the PCIe controller 100 has available via sockets 102 sixteen lanes 106. Assume that the PCIe controller 100 has one-hundred and twenty eight streams in its pool of streams, meaning that the PCIe controller 100 can support up to one-hundred and twenty eight concurrent streams. Further assume that no streams are currently allocated, meaning all one-hundred and twenty eight streams are available for allocation. Where a by-sixteen device 104 (e.g., a sixteen lane 106 device 104) is liked with the PCIe controller 100, in some implementations, the device 104 is allocated all one-hundred and twenty eight streams as the device 104 uses all possible lanes 106. As another example, where a by-eight device 104 is attached, sixty-four streams are allocated (e.g., half the pool of streams) as the device 104 uses half the supported lanes 106.

One skilled in the art will appreciate that, where a device 104 supports some maximum number of streams known to the PCIe controller 100, in some implementations, the number of allocated streams is limited by the maximum number of supported streams. Continuing with the example above, assume that a by-sixteen device 104 with a maximum number of thirty-two supported streams is coupled to the PCIe controller 100. Instead of allocating all one-hundred and twenty eight streams to the device 104 as is proportional to the number of used lanes 106, the maximum supported thirty-two streams are instead allocated to the device 104. As a further example, where a by-eight device 104 with a maximum number of sixteen streams is coupled to the PCI controller 100, the maximum sixteen streams are allocated instead of the proportional sixty-four streams.

In some implementations, the number of streams allocated to a device 104 is proportional or based on the number of lanes 106 used by the device 104 relative to other devices 104 coupled to other devices coupled to the PCI controller 100. For example, assume that a by-eight device 104 is coupled to a PCIe controller 100 supporting sixteen lanes 106 and having a pool of one-hundred and twenty eight streams. The by-eight device 104 is allocated all one-hundred and twenty eight streams as, of the eight lanes 106 of the PCIe controller 100 being used, all are being used by the device 104. Where the by-eight device 104 is coupled to the PCIe controller 100 along with two by-four devices 104, the by-eight device 104 (using half the lanes 106) is allocated sixty-four streams (half the streams), while the by-four devices 104 (each using one quarter of the lanes 106) are each allocated thirty-two streams (one quarter of the streams each).

As another example, assume that the by-eight device 104 is initially the only device coupled to the PCIe controller 100 and is thereby allocated all one-hundred and twenty streams. Further assume that the two by-four devices 104 are subsequently connected. In some implementations, in response to connecting the two by-four devices 104, sixty-four of the streams allocated to the by-eight device 104 are released and then reallocated to the two by-four devices 104. Thus, the proportional distribution of streams is maintained through reallocation of previously allocated streams.

In some implementations, allocating 304 the first one or more PCIe streams includes receiving 306, from the first PCIe device 104, data indicating a number of requested streams for the first PCIe device 104 and a number of PCIe lanes 106 used by the first PCIe device 104. For example, in some implementations, a device 104 stores in a configuration space 112 data indicating various operational parameters including, for example, unique identifiers for the device 104, identified protocols or versions (e.g., PCIe versions) supported by the device 104, a number of lanes 106 used by the device 104, a maximum number of streams supported by the device 104, a number of streams to be requested on connection, and other parameters as can be appreciated.

Accordingly, in response to a connection of the device 104 to the socket 102, the device 104 provides the data indicating the requested number of streams supported by the device 104 and the number of lanes 106 used by the device 104 to the PCIe controller 100. The PCIe controller 100 then allocates, from the pool of available streams, some number of streams less than or equal to the requested number of supported streams and provides, to the device, the corresponding portions of stream configuration data 110. As the number of available streams on the PCIe controller 100 is fixed and finite, the PCIe controller 100 is prevented from having an excessive number of streams unnecessarily allocated to a device 104 that is incapable of using them.

For further explanation, FIG. 4 sets forth a flow chart illustrating another example method for allocating peripheral component interface express (PCIe) streams in a configurable multiport PCIe controller according to implementations of the present disclosure. The method of FIG. 4 is similar to that of FIG. 3 in that the method of FIG. 4 also includes detecting 302 a link by a first PCIe device 104. and allocating 304 a first one or more PCIe streams from a pool of PCIe streams by receiving 306, from the first PCIe device, data indicating a number of requested streams for the first PCIe device 104 and a number of PCIe lanes 106 used by the first PCIe device 104.

The method of FIG. 4 differs from FIG. 3 in that the method of FIG. 4 includes detecting 402 another link by a second PCIe device 114. In some implementations, detecting 402 the other link includes detecting a physical connection to a socket 102 by the PCIe controller 100. In some implementations, detecting 402 the other link includes receiving, by the PCIe controller 100, a signal or other indication from a backplane component.

The method of FIG. 4 also includes allocating 404, to the second PCIe device 114, a second one or more PCIe streams from the pool of PCIe streams. In some implementations, the second one or more PCIe streams allocated to the device 114 include one or more streams previously unallocated to another device (e.g., the first PCIe device 104).

In some implementations, allocating 404 the second one or more PCIe streams includes reallocating 406 at least one of the first one or more PCIe streams from the first PCIe device 104 to the second PCIe device 114. For example, in some implementations, the second PCIe device 114 is connected when there are no remaining unallocated streams in the pool of streams. As another example, in some implementations, the PCIe controller 100 determines that the second PCIe device 114 should be allocated some number of streams greater than a number of available streams in the pool of streams. Accordingly, in some implementations, one or more of the streams allocated to the first PCIe device 104 are reallocated from the first PCIe device 104 to the second PCIe device 104.

For example, in some implementations, the PCIe controller 100 provides a command or signal to the first PCIe device 104 that one or more of the streams are to be reallocated. In response, the first PCIe device 104 ceases using the reallocated streams and continues to use other allocated streams. The PCIe controller 100 then provides stream configuration data 110 for the reallocated streams to the second PCIe device 114 to establish streams between the PCIe controller 100 and the second PCIe device 114. In other implementations, the PCIe controller 100 restarts the first PCIe device 104 or otherwise ends and restarts a link between the PCIe controller 100 and the first PCIe device 104, effectively releasing all streams previously allocated to the first PCIe device 104. The first PCI device 104 is then allocated a new subset of the pool of streams by the PCIe controller 100.

For further explanation, FIG. 5 sets forth a flow chart illustrating another example method for allocating peripheral component interface express (PCIe) streams in a configurable multiport PCIe controller according to implementations of the present disclosure. The method of FIG. 5 is similar to that of FIG. 3 in that the method of FIG. 5 also includes detecting 302 a link by a first PCIe device 104. and allocating 304 a first one or more PCIe streams from a pool of PCIe streams by receiving 306, from the first PCIe device, data indicating a number of requested streams for the first PCIe device 104 and a number of PCIe lanes 106 used by the first PCIe device 104.

The method of FIG. 5 differs from FIG. 3 in that the method of FIG. 5 includes detecting 502 a removal of the first PCIe device 104. In some implementations, detecting 502 the removal includes detecting that physical connection to a socket 102 no longer exist. In some implementations, detecting 502 the removal includes receiving, by the PCIe controller 100, a signal or other indication from a backplane component.

The method of FIG. 5 also includes releasing 504 the first one or more PCIe streams. Releasing 504 the first one or more PCIe streams includes storing an indication in the PCIe controller 100 that the first one or more PCIe streams are no longer allocated, and are therefore able to be allocated to other devices (e.g., currently connected devices or devices to be connected at a later date). For example, a table or other data structure associated with the stream configuration data 110 for the released streams is updated to indicate that the released streams are available for allocation.

In some implementations, where one or more other devices (e.g., devices 114,124) are coupled to the PCIe controller 100, releasing 504 the first one or more PCIe streams includes reallocating 506 one or more of the first one or more PCIe streams to one or more other PCIe devices. For example, in some implementations, the PCIe controller 100 provides the stream configuration data 110 for the reallocated streams to another device 114,124, thereby allowing the device 114,124 to establish another encrypted stream to the PCIe controller 100. In other implementations, the links or connections to other devices are restarted, forcing a new allocation of streams to all devices connected to the PCIe controller 100. Thus, the previously allocated streams are reallocated by virtue of a new full reallocation of streams across connected devices.

In view of the explanations set forth above, readers will recognize that the benefits of allocating peripheral component interface express (PCIe) streams in a configurable multiport PCIe controller include improved performance of a computing system by dynamic allocation and reallocation of PCIe streams for PCIe devices.

Exemplary implementations of the present disclosure are described largely in the context of a fully functional computer system for allocating peripheral component interface express (PCIe) streams in a configurable multiport PCIe controller. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:
1. A method of allocating peripheral component interface express (PCIe) streams in a configurable multiport PCIe controller, the method comprising:
   detecting, by a PCIe controller, a link with a first PCIe device; and
   allocating, for the link between the PCIe controller and the first PCIe device, a first one or more PCIe streams from a pool of PCIe streams, wherein a PCIe stream comprises a logically defined encrypted communications session between the PCIe controller and a PCIe device using one or more encryption keys.

2. The method of claim 1, wherein allocating the first one or more PCIe streams comprises:

receiving, from the first PCIe device, data indicating a number of requested streams for the first PCIe device and a number of PCIe lanes used by the first PCIe device, wherein the first one or more PCIe streams are allocated based on the number of requested streams and the number of PCIe lanes.

3. The method of claim 1, wherein the first one or more PCIe streams are allocated proportional to a number of lanes used by the first PCIe device.

4. The method of claim 1, further comprising:

detecting, by the PCIe controller, another link with a second PCIe device; and allocating, to the second PCIe device, a second one or more PCIe streams from the pool of PCIe streams.

5. The method of claim 4, wherein allocating the second one or more PCIe streams comprises reallocating at least one of the first one or more PCIe streams from the first PCIe device to the second PCIe device.

6. The method of claim 1, further comprising:

detecting a removal of the first PCIe device; and releasing the first one or more PCIe streams.

7. The method of claim 6, further comprising reallocating one or more of the first one or more PCIe streams to one or more other PCIe devices.

8. A multiport peripheral component interface express (PCIe) controller comprising a processor and memory, the memory comprising computer program instructions that, when executed by the processor, are configured to:

detect a link with a first PCIe device; and allocate, for the link between the PCIe controller and the first PCIe device, a first one or more PCIe streams from a pool of PCIe streams, wherein a PCIe stream comprises a logically defined encrypted communications session between the PCIe controller and a PCIe device using one or more encryption keys.

9. The multiport PCIe controller of claim 8, wherein the first one or more PCIe streams are allocated by:

receiving, from the first PCIe device, data indicating a number of requested streams for the first PCIe device and a number of PCIe lanes used by the first PCIe device, wherein the first one or more PCIe streams are allocated based on the number of requested streams and the number of PCIe lanes.

10. The multiport PCIe controller of claim 8, wherein the first one or more PCIe streams are allocated proportional to a number of lanes used by the first PCIe device.

11. The multiport PCIe controller of claim 8, further comprising computer program instructions that, when executed by the processor, are configured to:

detect, by the multiport PCIe controller, another link with a second PCIe device; and

allocate, to the second PCIe device, a second one or more PCIe streams from the pool of PCIe streams.

12. The multiport PCIe controller of claim 11, wherein allocating the second one or more PCIe streams comprises reallocating at least one of the first one or more PCIe streams from the first PCIe device to the second PCIe device.

13. The multiport PCIe controller of claim 8, further comprising computer program instructions that, when executed by the processor, are configured to:

detect a removal of the first PCIe device; and release the first one or more PCIe streams.

14. The multiport PCIe controller of claim 13, further comprising computer program instructions that, when executed by the processor, are configured to reallocate one or more of the first one or more PCIe streams to one or more other PCIe devices.

15. An apparatus for allocating peripheral component interface express (PCIe) streams in a configurable multiport PCIe controller, comprising:

a processor; and a PCIe controller operatively coupled to the processor, the PCIe controller configured to:

detect a link with a first PCIe device; and allocate, for the link between the PCIe controller and the first PCIe device, a first one or more PCIe streams from a pool of PCIe streams, wherein a PCIe stream comprises a logically defined encrypted communications session between the PCIe controller and a PCIe device using one or more encryption keys.

16. The apparatus of claim 15, wherein the first one or more PCIe streams are allocated by:

receiving, from the first PCIe device, data indicating a number of requested streams for the first PCIe device and a number of PCIe lanes used by the first PCIe device, wherein the first one or more PCIe streams are allocated based on the number of requested streams and the number of PCIe lanes.

17. The apparatus of claim 15, wherein the first one or more PCIe streams are allocated proportional to a number of lanes used by the first PCIe device.

18. The apparatus of claim 15, wherein the PCIe controller is further configured to:

detect another link with a second PCIe device; and allocate, to the second PCIe device, a second one or more PCIe streams from the pool of PCIe streams.

19. The apparatus of claim 18, wherein the second one or more PCIe streams are allocated by reallocating at least one of the first one or more PCIe streams from the first PCIe device to the second PCIe device.

20. The apparatus of claim 15, wherein the PCIe controller is further configured to:

detect a removal of the first PCIe device; and release the first one or more PCIe streams.

* * * * *